United States Patent Office 3,246,541
Patented Apr. 19, 1966

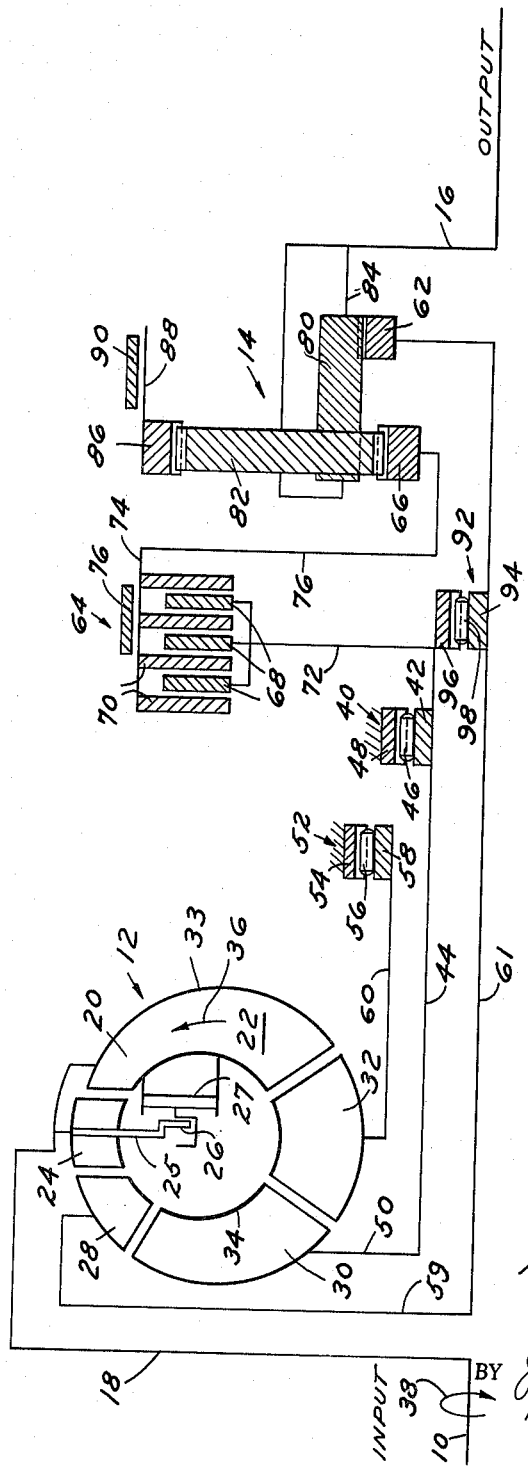

3,246,541
TRANSMISSION
Norman T. General, Orchard Lake, Mich., assignor to Ford Motor Company, Dearborn, Mich., a corporation of Delaware
Filed May 23, 1963, Ser. No. 282,703
1 Claim. (Cl. 74—677)

This invention relates to a motor vehicle type transmission. More particularly, it relates to one that is substantially automatic in operation and provides a plurality of forward and reverse drives without the use of a manually operated clutch between the engine and transmission.

One of the objects of the invention is to provide an automatic transmission that has a plurality of drive ranges of operation, and a plurality of different drives in each drive range.

Another object of the invention is to provide an automatic transmission construction combining the advantages of a multi-stage hydrodynamic torque transmitting device with a single planetary gearset in a manner to obtain a plurality of different drive ranges of operation, each range providing both a reduction drive and a direct drive through the gearset.

Another object of the invention is to provide a transmission construction combining a hydraulic torque converter and an intermeshing planet pinion type planetary gearset to obtain two drive ranges of operation, each alternately establishing a single torque path reduction drive and a split torque path direct drive through the gearset.

A further object of the invention is to provide an automatic transmission having both low and high ranges of operation, each range including low and high drives.

It is also an object of the invention to provide a transmission combining a multi-turbine hydraulic torque converter with a planetary gearset to provide two drive ranges of operation, the different ranges providing the full range of operation of the torque converter over different speed ranges.

It is also an object of the invention to provide a dual range automatic transmission of the torque converter and planetary gearset type, in which one of the ranges conditions the gearset for a split torque drive therethrough at all times.

A further object of the invention is to combine a multi-stage hydraulic torque converter with a single planetary gearset to provide dual ranges of operation; wherein, each range provides a split torque drive to the gearset, and the converter has a high split line between the turbines to provide full range of operation of the converter at a lower speed ratio during one drive range than during the other.

Other objects, features, and advantages of the invention will become apparent upon reference to the succeeding detailed description thereof, and to the drawing illustrating the preferred embodiment thereof; wherein, the figure illustrates schematically one-half of a transmission embodying the invention.

The figure shows a transmission having a power input shaft 10 driving a hydraulic torque converter 12, from which the torque is split to a planetary gearset 14. The output of the gearset drives a power output shaft 16. The input shaft 10 is connected to any suitable source of power, such as, for example, the internal combustion engine for a motor vehicle.

Shaft 10 is drive connected by an annular shell 18 to the impeller 20 of torque converter 12. The impeller includes a number of circumferentially spaced pump blades 22 having variable angle fluid exit blade portions 24 controlling the high or low torque stall speed characteristics. The blades 24 are mounted on a rotatable shaft 25 having an offset crank portion 26 movable in an arcuate cam slot. The cam slot is moved to rotate the crank in a known manner by a fluid pressure actuated piston 27.

The impeller blades face a first turbine wheel or member 28 consisting of circumferentially spaced air foil type blades substantially dish-shaped in cross section. Fluid discharged from the first turbine 28 strikes the blades of a second turbine wheel 30 of similar shape cooperating with an annular stator or reaction member 32. All of the pump, turbine and stator blades are secured between inner and outer annular respective shroud members 33 and 34. The shrouds together define a toroidal path 36 for the circulation of fluid in a clockwise direction from the pump through the turbines and stator in a known manner to initially provide torque multiplication.

The shape of the turbine blades 28 and 30 are substantially the same in cross section, as previously described, while the blades of the stator 32 are oppositely facing. In this manner, the discharge of fluid from the impeller tends to rotate the turbine 28 forwardly or clockwise in the direction of the arrow 38. Initially, at low speeds of the turbine 28, however, due to the angle of discharge, the fluid strikes the back of the stationary blades of turbine 30 tending to rotate it in a reverse or counterclockwise direction, thereby imposing negative torque on the system. This reverse rotation, however, is prevented by means of a one-way or overrunning coupling 40.

Coupling 40 is of a known type. It has an inner annular race 42 secured to an intermediate shaft 44, the race being separated by sprags or rollers 46 from an outer annular race 48 fixed to a stationary portion of the transmission. The intermediate shaft is fixed for rotation with the turbine 30 by a connecting flange 50. The coupling sprags or rollers 46 wedge the inner and outer races 42 and 48 together upon counterclockwise or reverse movement of intermediate shaft 44 relative to the outer race, and thereby prevent movement of the inner race and shaft 44 in this direction. Forward or clockwise rotation of shaft 44 is permitted, however, by the coupling unlocking or overrunning. That is, as the speed of turbine 28 increases, the angle of discharge of the fluid changes progressively so that, at some predetermined point, the fluid no longer strikes the back of the blades of turbine 30, but strikes its forward portions, thereby rotating it clockwise in the same direction as turbine 28. This rotation is permitted because of the unlocking of coupling 40.

When turbine 30 is stationary or rotating forwardly slowly, the fluid discharged from its blades strikes the concave faces of the stator blades 32 tending to rotate them in a reverse or counterclockwise direction. This is prevented, however, by a one-way overrunning brake 52, thus providing torque multiplication. The brake 52 is of a construction similar to brake 40, consisting of an outer annular race 54 separated by a series of sprags or rollers 56 from an inner annular race 58 fixed to a sleeve shaft 60. The sleeve shaft in turn is fixed to the stator member 32. The brake prevents reverse rotation of the stator, as stated, while permitting free rotation in a clockwise direction.

As the speed of turbine 30 increases, the angle at which the fluid leaves the blades changes progressively until a point is reached where the fluid strikes the back or convex side of the stator blades, thereby tending to rotate them forwardly. The one-way brake 52 therefore overruns and torque conversion through the converter ceases. The converter, therefore, becomes a hydraulic coupling or clutch and merely transmits the torque of the input shaft to the turbine output shafts without providing any multiplication thereof.

The two turbines 28 and 30 provide a split torque power path to the gearset 14. One path is from turbine 28 through a driving flange 59 and turbine shaft 61 to a first sun gear 62 of the gearset 14. The other path is from turbine 30 through shaft 44 and a selectively engageable clutch 64 to a smaller diameter sun gear 66. The clutch 64 is of a known fluid pressure actuated type having inner and outer interleaved sets of annular friction driving discs 68 and 70. The inner set 68 is axially slidably splined to a drum member 72 fixed to shaft 44. The outer discs 70 are axially slidably splined to a drum-like clutch member 74 drive connected by a flange 76 to the sun gear 66. The clutch is engaged by a fluid pressure actuated piston, not shown, sliding the clutch discs together, and disengaged by suitable spring means, also not shown, upon vent of the fluid pressure.

The outer peripheral portion of clutch drum 74 is provided with a friction surface for cooperation with an annular brake band 76. The band is also of the fluid pressure actuated type. When engaged with brake surface 74, it prevents rotation of sun gear 66 and turbine 28 in either direction.

The gearset 14 is of the intermeshing planet pinion gear type. That is, sun gear 62 meshes with a relatively long planet pinion gear 80, which meshes with a short pinion gear 82. The pinions are both rotatably supported upon a common carrier 84 fixed to output shaft 16. The short pinion 82 meshes with the small diameter sun gear 66 and also with a ring gear 86. The ring gear has an extended drum-like portion 88 having an outer frictional surface adapted to cooperate with a second fluid pressure actuated brake band 90. Band 90, when engaged, holds the ring gear stationary to provide a reverse drive of output shaft 16 in a manner that will be described.

In addition to the clutch and brake controls described, the two turbines 28 and 30 are adapted to be connected or locked at times to each other by an overrunning clutch 92 to provide a direct drive of the gearset. The one-way clutch has inner and outer annular races 94 and 96 separated by sprags or rollers 98. The inner race is secured to turbine shaft 61. The outer race 98 is secured to both the turbine shaft 44 and the inner clutch flange 72. Thus, at low speeds of rotation, when turbine 28 is rotating forwardly relative to turbine 30, the clutch 92 is disengaged, and turbine 28 drives sun gear 62. When turbine 30 starts rotating forwardly and increases in speed to a point equal to that of turbine 26, the clutch 92 then locks up, causing the unitary rotation of both turbines at the speed of turbine 30. This causes sun gear 62 to be rotated at the speed of turbine 30, and, if clutch 64 is engaged, sun gear 66 also to be rotated at the same speed to effect a lockup of the gearset. Thus, a mechanical direct drive is established through the gearset.

In general, the transmission has two forward drive ranges, each range providing a reduction drive and a direct drive through the gearset. In the low forward drive range, the brake band 76 is applied to hold sun gear 66 stationary and condition the gearset for a reduction drive. A shift to direct drive, by releasing the band and engaging the clutch 64, occurs when the full range of torque conversion has been covered by converter 12.

The high drive range consists of starting up with the gearset conditioned for direct drive by the engagement of clutch 64. Under these conditions, initial reverse or counterclockwise rotational tendency of sun gear 66 and turbine 30 is prevented by the one-way brake 40 to provide a low gear reduction drive start. Subsequent clockwise rotation of turbine 30 automatically effects a progressive change in speed ratio of the gearset until a mechanical direct drive lockup of the gearset is obtained by the engagement of one-way clutch 92.

More specifically, a neutral condition of operation is obtained by disengaging brake bands 76 and 90, and clutch 64. Clockwise rotation of shaft 10 in the direction of arrow 38 then rotates pump 20 of converter 12 to rotate turbine 28, shaft 61 and sun gear 62 forwardly. Since there is no member to hold sun gear 66 stationary, it merely rotates freely in a reverse direction, thereby preventing the drive of output shaft 16.

Forward drive range I is obtained by applying brake band 76, and releasing band 90 and clutch 64. Initial clockwise rotation of input shaft 10 therefore drives pump 20 and turbine 28 in the same direction to drive sun gear 62 forwardly. The initial resistance to rotation of the load shaft 16 holds carrier 84 stationary. The pinion 80 is therefore rotated in a counterclockwise direction, rotating pinion 82 clockwise. This rotation attempts to rotate sun gear 66 counterclockwise, which motion, however, is prevented by the band 76. The pinion 82 is thereby forced to walk around the sun gear 66 in a clockwise direction, driving carrier 84 and output shaft 16 in the same direction and at a speed reduced from that of input shaft 10.

As the speed of rotation of turbine 28 increases, the turbine 30 begins to rotate forwardly. At an appropriate time, when the full range of torque conversion has been covered in the converter 12, turbines 28 and 30 will be rotating at substantially the same speeds. The reduction through the gearset will, therefore, have reached a point where a shift to direct drive is desirable. Band 76 is then released and clutch 64 engaged in timed relationship. Both sun gears 62 and 66 are therefore driven at the speed of turbines 28 and 30, respectively, and the gearset is conditioned substantially for a direct drive. When turbine 30 rotates at the speed of or faster than that of turbine 28, the one-way clutch 92 will engage to lock the two turbines together and lock up the gearset for a direct drive. Output shaft 16 is therefore driven at the speed of turbines 28 and 30.

The forward drive range II is provided by initially engaging clutch 64 and releasing bands 76 and 90. The gearset is therefore initially conditioned for a split torque drive due to the dual input torque connection to the sun gears. Initial forward rotation of input shaft 10 now drives pump 20 and turbine 28 forwardly to rotate sun gear 62 in the same direction. The intermeshing pinions 80 and 82 rotate about the stationary carrier 84 and attempt to rotate sun gear 66 rearwardly. Since this rotation is prevented by engagement of the one-way brake 40, the carrier 84 is driven forwardly at a reduced speed. The gearset is thus conditioned for reduction drive, and output shaft 16 is driven forwardly at a speed reduced from that of input shaft 10.

As soon as turbine 30, and therefore sun gear 66, begins rotating forwardly, the gearset will begin changing progressively from a reduction drive condition of operation towards a direct drive. At a point when the speed of turbine 30 just exceeds that of turbine 28, the one-way clutch 92 will engage to cause sun gears 66 and 62 to be driven at the same speed, thereby locking up the gearset and rotating output shaft 16 at the speed of turbine 30. Thus, it will be seen that the second drive range provides a shiftless, automatic transition from a start-up reduction drive to a direct drive.

Reverse drive is obtained by engaging brake band 90 to hold ring gear 86 stationary, and disengaging band 76 and clutch 64. Forward rotation of input shaft 10 initially drives pump 20 and turbine 26 forwardly, rotating sun gear 62 in the same direction. The initial resistance to rotation of output shaft 16 and carrier 84 causes pinion 80 to rotate counterclockwise and pinion 82 clockwise. With ring gear 86 stationary, the pinion 82 is forced to walk around within the ring gear in a counterclockwise direction, thereby driving carrier 84 and output shaft 16 in the same direction and at a reduced speed. The sun gear 66 rotates freely in a reverse direction without influencing the drive.

From the foregoing, it will be seen that the invention provides a dual range automatic transmission wherein each of the drive ranges provides a torque converting low drive and a split torque direct drive. It will also be seen that the transmission is capable of being started with the gearset conditioned for a direct drive, the torque conversion being obtained through the use of a multi-turbine fluid converter having a high split line and combined with a clutch between the turbine members. It will further be seen that the fluid losses in the direct drive are at a minimum due to the one-way clutch 92 locking the turbines together to lock up the gearset.

While the invention has been illustrated in its preferred form, it will be clear to those skilled in the arts to which the invention pertains, that many changes and modifications may be made thereto without departing from the scope of the invention.

I claim:

A transmission comprising power input and output shafts, and means operably connecting said shafts for two different driving ranges therebetween, each of which includes a direct drive and a reduction drive, said means including a hydrodynamic drive device and a planetary gearset, said device including a pump and a plurality of turbines, said gearset having a plurality of rotatable members including a plurality of sun gears and a planet gear carrier, means connecting said pump to said input shaft, means connecting said carrier to said output shaft, means operatively connecting first and second ones of said turbines in different paths to first and second ones of said gearset sun gears, releasable brake means for holding said second sun gear stationary to condition said gearset for a fixed reduction drive in one driving range, a selectively engagable clutch between said second turbine and said second sun gear when engaged and said brake means released permitting the flow of torque to both of said sun gears from said first and second turbines to establish a split torque substantially direct drive of said gearset in said one driving range, and a pair of overrunning couplings in back-to-back relationship for automatically controlling rotation of said turbines and sun gears in a second driving range, said couplings sharing a common race portion fixed to said second turbine and a portion of said clutch, one of said couplings comprising a one-way brake preventing rotation of said second turbine and clutch portion in one direction while permitting rotation in the opposite direction, the other of said couplings comprising a one-way clutch connecting said turbines for the automatic rotation of said first turbine by said second turbine upon rotation of said second turbine off said one-way brake, the engagement of said clutch and release of said brake means establishing said second driving range whereby said one-way brake provides reaction for said second sun gear to establish a reduction drive through said gearset and an automatic pickup shift to a direct drive therethrough upon overrun of said second turbine with respect to said one-way brake engaging said one-way clutch and driving said first turbine.

References Cited by the Examiner

UNITED STATES PATENTS

| | | | |
|---|---|---|---|
| 2,312,849 | 3/1943 | Pollard | 74—677 |
| 2,624,215 | 1/1953 | McRae | 74—677 |
| 2,768,537 | 10/1956 | Seybold | 74—677 |
| 3,083,589 | 4/1963 | Knowles et al. | 74—677 |
| 3,090,252 | 5/1963 | Mamo | 74—677 |

DAVID J. WILLIAMOWSKY, *Primary Examiner.*

DON A. WAITE, *Examiner.*

T. C. PERRY, *Assistant Examiner.*